Figure 1:
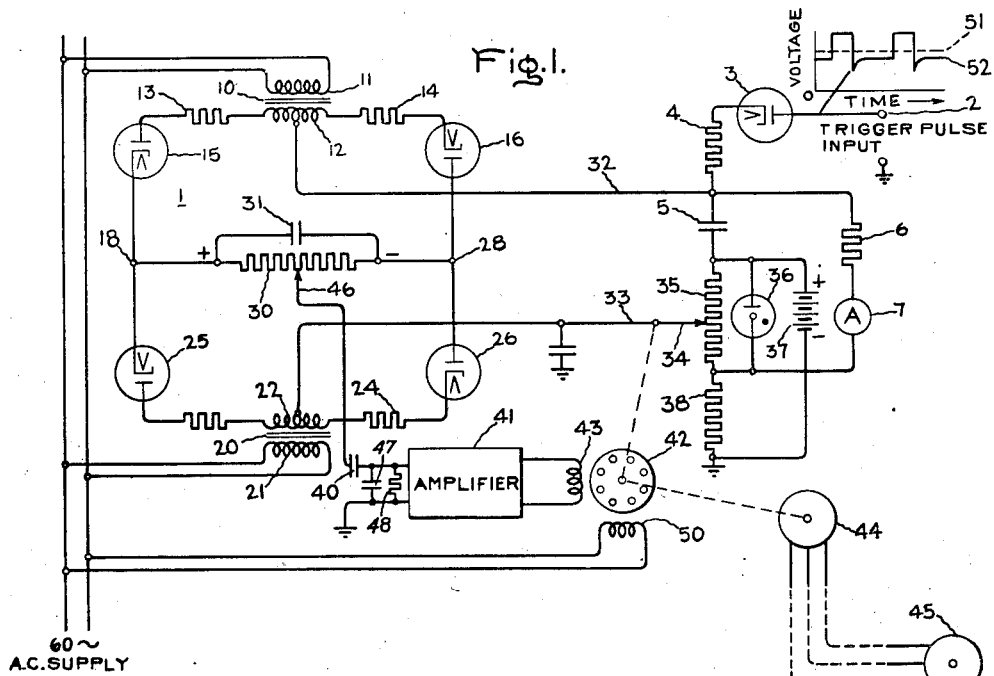

May 31, 1949.　　　D. E. NORGAARD　　　2,471,835
MODULATOR CIRCUIT
Filed July 1, 1948

Inventor:
Donald E. Norgaard,
by Merton W. Moore
His Attorney.

Patented May 31, 1949

2,471,835

UNITED STATES PATENT OFFICE 2,471,835

MODULATOR CIRCUIT

Donald E. Norgaard, Scotia, N. Y., assignor to General Electric Company, a corporation of New York Application July 1, 1948, Serial No. 36,367

3 Claims. (Cl. 332—9)

This invention relates to voltage measuring and indicating systems generally, and has particular application to apparatus for developing and transmitting to a remote point an indication which is a function of the width of a recurrent electrical pulse.

This application is a continuation-in-part of my copending application Serial No. 520,724, filed February 2, 1944, and assigned to the same assignee as the present application.

In radar equipment use is often made of apparatus for translating to a remote point an electrical quantity, varying as a function of pulse spacing or width, and capable of accurately actuating and controlling an electro-mechanical device. This invention provides a new and improved apparatus for effecting this purpose and is particularly well adapted to operate in conjunction with the range-measuring circuits of a radar equipment such as that described in my aforesaid copending application, Serial No. 520,724.

An object of the present invention is to provide an improved means for measuring and indicating the width of a recurrent pulse.

Another object of this invention is to provide an improved means for indicating through a remote electro-mechanical indicator the width of a recurrent pulse.

A further object of this invention is to provide means for supplying to a suitable utilization circuit an alternating current voltage whose amplitude and polarity are functions of the magnitude and sign of the difference between a unidirectional control potential and a unidirectional reference potential.

In one preferred embodiment of the present invention, a local indication of the average width of recurrent pulses is effected by means of an instrument which measures the accumulation in a capacitance of a charge whose magnitude is proportional to the width of the pulses. A remote indication is also provided by means of a network which generates alternating voltages whose amplitude and polarity are dependent upon the difference existing between the potential developed across this capacitance and a reference potential. These alternating voltages are utilized to drive a motor which reduces the difference potential towards zero by adjusting a potentiometer and which simultaneously drives a Selsyn transmitter to generate voltages for the remote indication by a Selsyn receiver.

For additional objects and advantages and for a better understanding of the invention, attention is now directed to the following description and accompanying drawing, and also to the appended claims in which the features of the invention believed to be novel are particularly pointed out.

Figure 2:
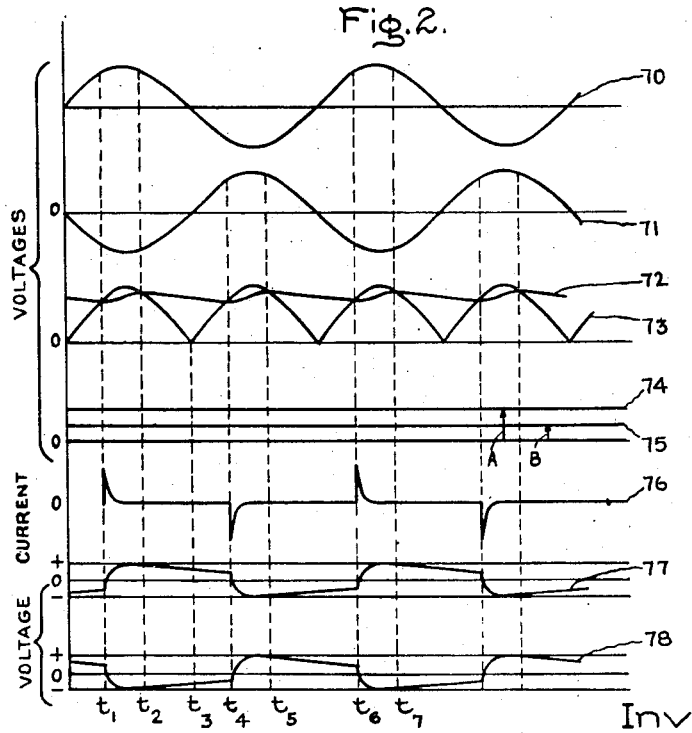

In the drawings, Fig. 1 is a circuit diagram of an embodiment of the invention, and Fig. 2 shows a number of curves, illustrating, on a common time axis, the voltages and currents existing at various points in the circuit during operation.

Referring to Fig. 1, there is shown an input voltage represented by curve 52 which consists of a series of substantially square pulses of constant amplitude superimposed on a unidirectional voltage. While the present invention is not limited thereto, these pulses may, for example, be range pulses from a radar tracking system such as that shown in my aforesaid copending application, Serial No. 520,724. In such case, the width of each portion of maximum amplitude in curve 52 is a function of the time interval between a very short transmitted pulse and the corresponding echo from a target whose range is to be determined. This voltage is impressed from trigger pulse input terminal 2 on the anode of a diode valve 3 whose cathode is connected, in series with a current limiting resistance 4, to a capacitance 5. The circuit is completed to ground through a potentiometer 35 in series with a resistance 38. A source of bias voltage, represented by a battery 37, is connected across potentiometer 35 and resistance 38, the upper terminal being positive, as indicated. A voltage regulator valve 36 stabilizes the voltage existing across the potentiometer 35. The voltage developed across resistance 38 is applied by means of an ammeter 7 in series with a resistance 6 to the junction of capacitance 5 and resistance 4, while the whole of the voltage developed by the battery is applied to the other terminal of capacitance 5. The voltage across resistance 38 is of such magnitude that the diode 3 will conduct only during the part of the pulse that rises above this voltage, as represented by that part of curve 52 rising above line 51. Accordingly no current flows through the diode 3 during the intervals between the pulses. During each pulse, current flows to the ammeter 7 through the diode 3 and resistance 6 and to the capacitance 5. At the end of the pulse when the voltage at the anode of diode 3 returns to a value less than the voltage across resistance 38, the current is interrupted, but due to the integrating effect of the ammeter and of capacitance 5, the ammeter reading will be proportional to the pulse width and will thus provide the local indication required.

The remote indication of the pulse width is provided by means of a Selsyn receiver 45 connected to a Selsyn transmitter 44. The Selsyn transmitter is mechanically coupled to a motor 42 which simultaneously operates a slider 34 on potentiometer 35. The function of the remainder of the circuit of Fig. 1 is to supply voltages of the proper phase and magnitude to the winding 43 of motor 42 to drive it so as to move tap 34 on potentiometer 35 to a position such that the voltage on conductor 33 is maintained substantially equal to that on conductor 32. Since the voltage on conductor 32, which is that developed across capacitance 5 by the charging circuit through diode valve 3, is proportional to the average width of the input pulses and is always somewhat less than the voltage across the voltage regulator valve 36, the voltage on the capacitance can be balanced by adjusting the slider 34 on the potentiometer 35. For example, if the pulse width were 100% of the period between the leading edges of consecutive pulses, the upper terminal of the capacitance 5 would be at almost the peak potential of the pulses and the voltage on lead 32 could be balanced by moving the slider 34 to a point near the top of the potentiometer 35. If the pulse width were 0% of the interval between pulses, the capacitance would be charged to the voltage of the voltage regulator tube and the voltage on the lead 32 could be balanced by moving the slider 34 to the bottom of the potentiometer 35. At intermediate range delay intervals, to balance the voltage on lead 32, the slider 34 should occupy a position from the bottom of the potentiometer 35 corresponding to the ratio of the average pulse width to the average period between leading edges of consecutive pulses. Thus the displacement of tap 34 from the lower terminal of potentiometer 35 is a linear function of the average pulse width. Accordingly, the remote Selsyn receiver, by repeating a similar displacement, gives an indication proportional to the average width of the input pulses.

The alternating voltages supplied to winding 43 are generated by alternately switching the input of amplifier 41, by means of a modulator 1, from conductor 32 to conductor 33 at a frequency determined by the alternating current supply, which in this embodiment is 60 cycles per second.

The modulator 1 comprises four diode valves 15, 16, 25 and 26. The anode of valve 15 and cathode of valve 16 are provided with out-of-phase alternating potentials by the secondary 12 of a transformer 10 whose primary 11 is connected across the 60-cycle supply. A similar circuit for valves 25 and 26 is provided by the secondary 22 of transformer 20 whose primary 21 is connected across the 60-cycle supply in such a way that the voltage applied to the anode of valve 25 is opposite in phase from that applied to the anode of valve 15. The conjugate points 19 and 29 of the modulator are connected by a potentiometer 30 in parallel with a capacitance 31. The potentiometer has a tap 46 connected through a capacitance 40 to the input terminals of an amplifier 41, which have a resistance 48 and a capacitance 47 connected in parallel across them. The center taps of the secondaries 12 and 23 are connected, respectively, to conductors 32 and 33. The modulator circuit also comprises resistances 13, 14, 23 and 24, inserted in the anode leads of the diode valves. The purpose of these resistances is to effectively increase the anode impedances of these valves and thus render the operating characteristics of the circuit substantially independent of the valve characteristics.

In operation, there is developed across secondary 12 a voltage represented by curve 70 in Fig. 2 and across secondary 22 a similar voltage of opposite phase as represented by curve 71. The pairs of valves 15—16 and 25—26 conduct during alternate half-cycles and the voltage developed across resistance 30, if capacitance 31 were made equal to zero, would be that represented by curve 73. In this embodiment, for purposes that will presently appear, it has been found expedient to choose the values of capacitance 31 and resistance 30 so that their time constant is considerably longer than the period of a half-cycle of the 60-cycle supply voltage. Under these circumstances the voltage developed across resistance 30 is as represented by curve 72.

During the half-cycle when current is flowing through diodes 15 and 16, the midpoint of secondary 12 will be at the same potential as the tap 46 on potentiometer 30 if tap 46 is properly adjusted. Accordingly, conductor 32 is at this moment effectively connected to capacitor 40, and current flows through this capacitance tending to charge it to the potential existing on conductor 32. As soon as diodes 15 and 16 stop conducting, this effective connection is broken and the midpoint of the potentiometer 30 is then floating. On the next succeeding half-cycle, when diodes 25 and 26 are conducting, the midpoint of secondary 22 will be at the same potential as the midpoint of potentiometer 30. Accordingly, conductor 33 is at this moment effectively connected to capacitance 40 and current flows through this capacitance tending to charge it to the potential existing on conductor 33. The amplifier input circuit, comprising capacitance 47 shunted by the high input resistance 48 of amplifier 41 is selected to have a time constant somewhat longer than the period of the power supply. The capacitance 40 will be charged to an average potential equal to the average potential of conductors 32 and 33, while the charge in capacitance 47 will average zero. The voltage across capacitance 47, however, will alternate from positive to negative at the frequency of the power supply. The peak-to-peak voltage thus applied to amplifier 41 will be somewhat less than the potential difference existing between conductors 32 and 33.

In practice, capacitance 47 has a smaller value than capacitance 40, so that a large percentage of the voltage difference between conductors 32 and 33 appears as an alternating potential applied to amplifier 41.

Whenever the reverse voltage existing between cathode and anode of either of the diode valves 15 and 16 of the modulator is less than the difference in voltage between the center tap of secondary 12, and the center point of potentiometer 30, current can flow to equalize this difference in voltage. Similarly, current can flow from the center tap of secondary 22 to the center point of potentiometer 30 under similar conditions. If the value of capacitance 31 were made zero and the voltage developed across the potentiometer 30 were as represented by curve 73, then at the instant $t_3$ the reverse voltage across each of the diode valves in modulator 1 would be zero. At that instant a positive voltage at the center tap of secondary 12 would cause a current to flow through valve 15, potentiometer 30 and the valve 26 to the center tap of secondary 22. A negative voltage, on the other hand, would cause a current to flow from the center tap of secondary 22 through valve 25, potentiometer 30 and valve 16 to the center tap of potentiometer 12. Such a condition would be objectionable because it would effectively connect conductor 32 through potentiometer 30 to conductor 33 without supplying any corrective voltage to the input of amplifier 41. To prevent this from occurring, capacitance 31 is connected across potentiometer 30 and, as previously mentioned, is selected so that the time constant of the combination is considerably longer than a period of the 60-cycle supply. Also the alternating voltage output of the secondaries 12 and 22 is considerably larger than the unidirectional voltages on conductors 32 and 33.

When the operating conditions are so selected, the diode valves will conduct only near the positive peaks of the waves 70 and 71. Thus, referring to Fig. 2, valves 15 and 16 will conduct from time $t_1$ to time $t_2$ and charge capacitance 31 to a voltage almost as large as the peak alternating voltage of curve 73. From time $t_2$ to time $t_4$ capacitance 31 slowly discharges through potentiometer 30, and at time $t_4$ diode valves 25 and 26 conduct to recharge capacitance 31 until time $t_5$. At time $t_6$ the charging process begins once more through valves 15 and 16. Let it be assumed that the voltage existing on conductor 32 is as represented by line 74 having a constant value A and that existing on conductor 33 is as represented by line 75 having value B. Since the value of each of these voltages is small in comparison with the alternating voltage applied across the diode valves, the equalizing currents through the diode valves, flowing from the center taps of secondaries 12 and 22 to the center point of potentiometer 30, will start to flow at substantially the same time as the charging current through these valves into capacitance 31, and will also stop at substantially the same time. Thus, there is no possibility of current flowing from conductor 32 into conductor 33 and destroying the unequality between the voltages on these conductors without correcting the position of tap 34 on potentiometer 35.

Since the input circuit of amplifier 41 also has a long time constant, the charging current into capacitances 40 and 47 will consist of a series of short, exponentially-decreasing pulses, as represented by curve 76. The voltage across capacitance 47, on the other hand, will consist of a series of steps, each one of which is initiated by a fast exponential change, followed by a slow exponential decay until the succeeding fast exponential change. When the potential A of the voltage existing on conductor 32 is greater than the potential B of the voltage existing on conductor 33, the input voltage to the amplifier 41 will be as represented by curve 77. When conditions are reversed and potential A is smaller than potential B the input voltage will be as represented by curve 78. Curves 77 and 78 each represent a unidirectional voltage having an alternating component whose fundamental frequency is 60 cycles per second. The magnitude of this alternating component is proportional to the difference between the voltages represented by curves 74 and 75 and its polarity is dependent on the sign of this difference.

Thus, from one aspect, the modulator can be considered as a pair of bridge circuits having a common pair of diametrically-opposite terminals at opposite ends of the resistance 30 and another pair of intermediate terminals at tap 46 on the potentiometer 30 and at the taps on the secondaries 12 and 22. The voltage at the tap on potentiometer 30 accordingly shifts at the frequency of the alternating current supply from the potential of conductor 32 to the potential of slider 34, producing a substantially square wave voltage of the power supply frequency which varies in magnitude and polarity with the error and direction of the displacement of the slider 34 from the position of balance.

The alternating component supplied to amplifier 41 is amplified and utilized to excite winding 43 of the motor 42. The direction of rotation of the motor will be dependent upon the polarity of the alternating voltage supplied to winding 43 with respect to that supplied to winding 50, and its speed will be dependent upon the magnitude of this voltage. Since motor 42 is so coupled to tap 34 on potentiometer 35 as to reduce the difference between the unidirectional voltages controlling the alternating voltages actuating it, it will operate continuously to eliminate this difference as soon as it begins to arise. It is thus apparent that the potential difference between conductors 32 and 33 will be automatically kept to a small value, and that the position of the slider 34 will be proportional to the percentage pulse width of the signal applied to terminal 2 within close limits.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. A system for producing a voltage having an alternating voltage component whose magnitude and polarity are functions of the magnitude and sign of the difference of two unidirectional voltages, comprising two interconnected bridge circuits having one pair of bridge arms in common between a common pair of diametrically-opposite terminals, said pair of arms comprising an impedance capable of carrying direct current and having a tap connection forming a common intermediate bridge terminal, second and third pairs of bridge arms individual to the respective circuits each comprising a pair of unilaterally-conducting devices, means for impressing an alternating supply voltage between the devices of each of said pairs, said means comprising a pair of transformer windings each having a tap connection forming the other intermediate terminal of the respective bridge circuit, said pairs of devices being poled to conduct on alternate half-cycles of said supply voltage and to pass current in the same direction through said impedance, means for impressing said two unidirectional voltages respectively between said other intermediate bridge terminals and a point of reference potential, whereby said alternating voltage component appears between said common intermediate terminal and said reference point.

2. A system for producing an output voltage having an alternating component of reference frequency whose magnitude and polarity are functions of the magnitude and sign of the instantaneous difference of two potentials, said potentials containing alternating components of a frequency substantially lower than said reference frequency, a source of alternating voltage of said reference frequency, a pair of interconnected bridge circuits having one pair of bridge arms in common between a common pair of diametrically-opposite terminals, said pair of arms comprising a resistance having a tap connection forming a common intermediate bridge terminal, a capacitance in shunt to said resistance, second and third pairs of bridge arms individual to the respective circuits each including a pair of rectifiers on either side of a transformer secondary winding, each said winding having a tap connection forming the other intermediate terminal of the respective bridge circuit, means for inducing alternating reference voltages in said respective windings from said source, said pairs of devices being poled to conduct on alternate half-cycles of said reference voltages and to pass current through said resistance in the same direction, means for impressing said potentials respectively on said transformer tap connections, whereby said output voltage is developed at said common bridge terminal.

3. A system for producing a substantially rectangular alternating voltage varying in magnitude and polarity with the magnitude and sign of the difference of two unidirectional voltages, comprising two interconnected bridge circuits having one pair of bridge arms in common between a common pair of diametrically-opposite terminals, said pair of arms comprising a time constant network including a capacitance in parallel with a resistance, said resistance having a tap connection forming an intermediate bridge terminal at the junction of said arms, second and third pairs of bridge arms individual to the respective circuits each comprising a pair of rectifiers on either side of a transformer winding, each said winding having a tap connection forming the other intermediate terminal of the respective bridge circuit, means for impressing an alternating supply voltage from a common source on said winding, said pairs of devices being poled to conduct on alternate half-cycles of said supply voltage and to pass current in the same direction through said resistance, the time constant of said network being long relative to the period of said half-cycles, means for impressing said two unidirectional voltages respectively between said other intermediate bridge terminals and a point of reference potential, whereby said substantially rectangular alternating voltage appears between said common intermediate terminal and said reference point.

DONALD E. NORGAARD.

No references cited.